Patented Feb. 13, 1934

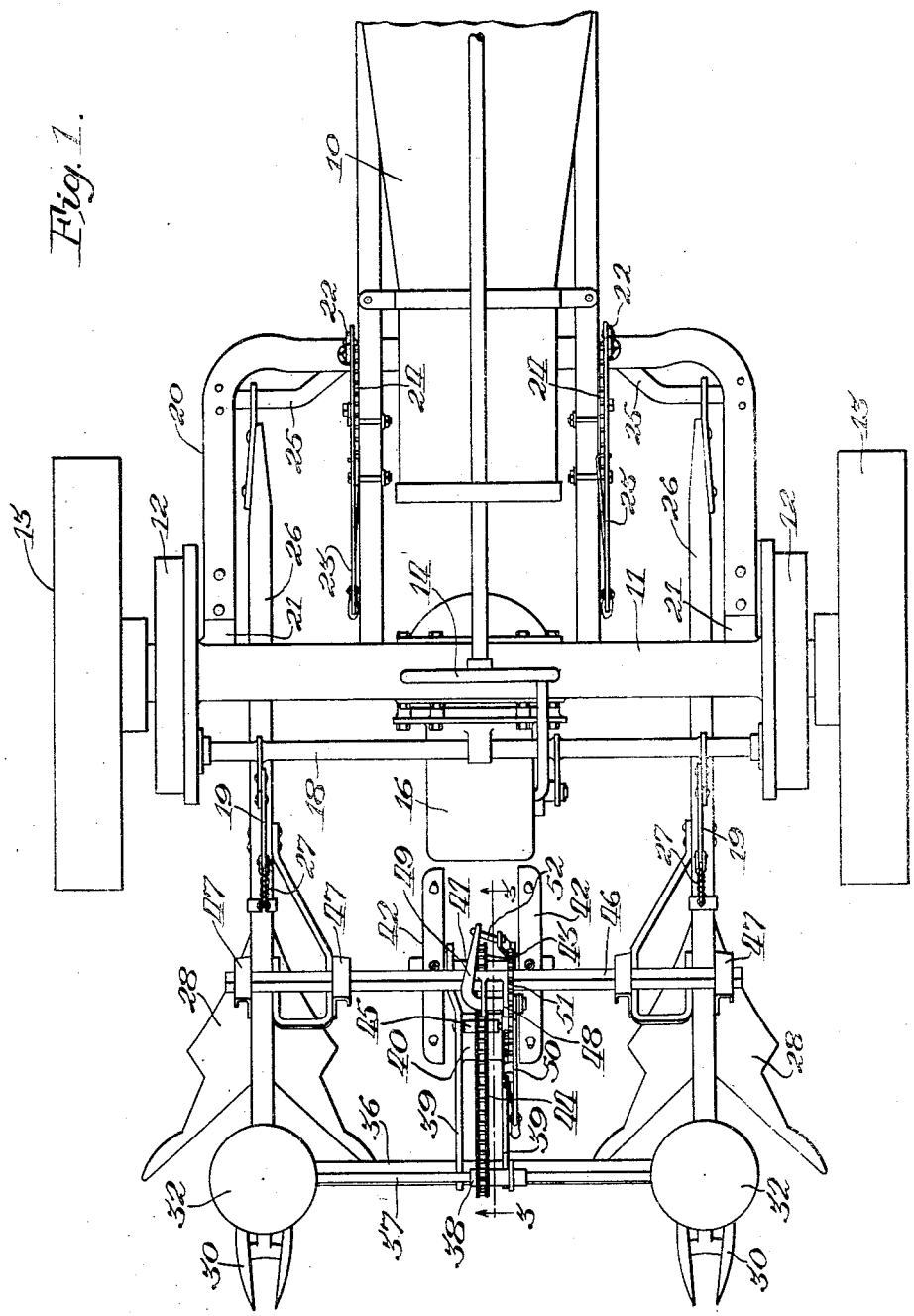

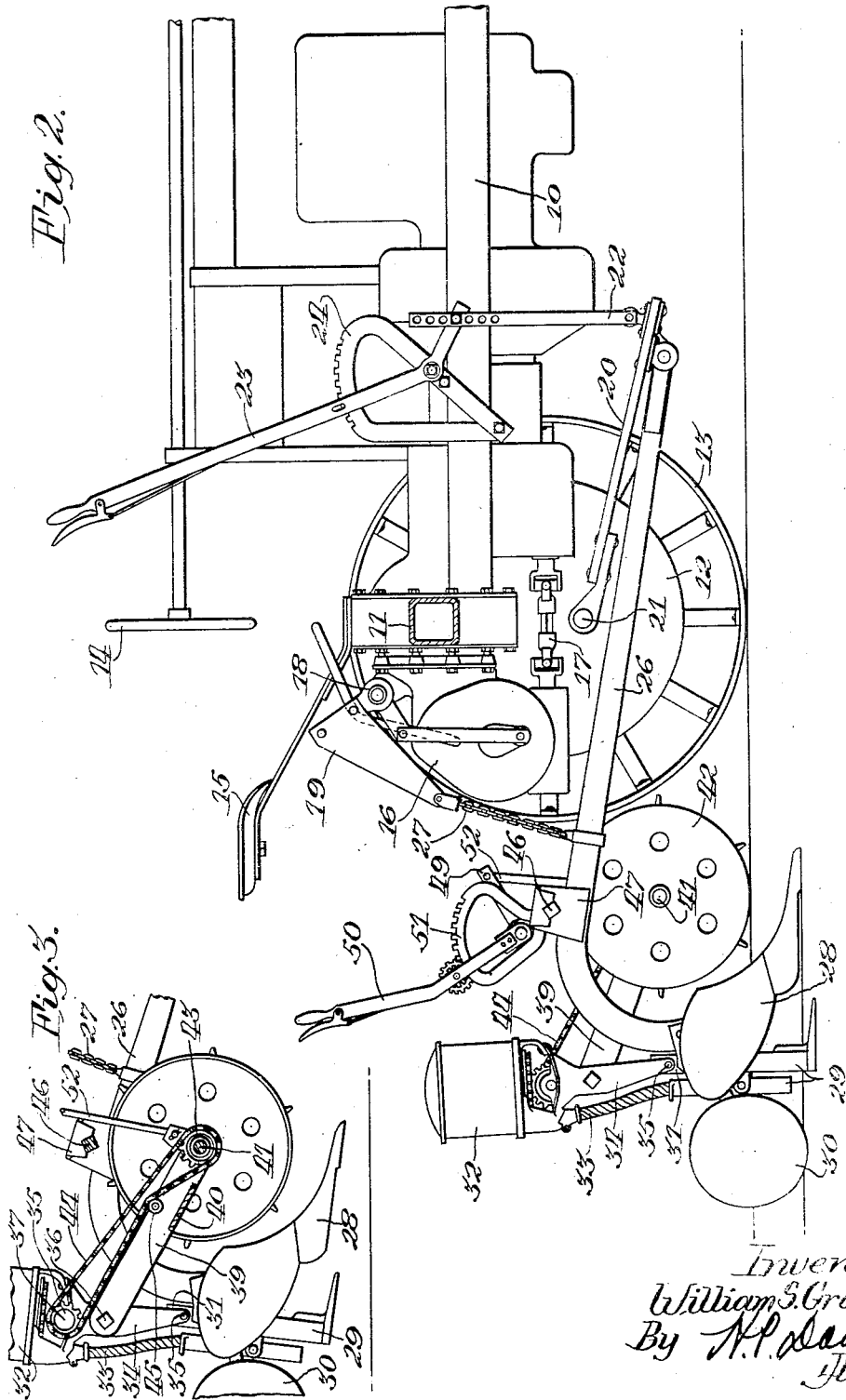

1,946,685

UNITED STATES PATENT OFFICE 1,946,685

LISTER PLANTER ATTACHMENT FOR TRACTORS

William S. Graham, Canton, Ill., assignor to International Harvester Company, a corporation of New Jersey Application July 28, 1932. Serial No. 625,485

5 Claims. (Cl. 111—63)

The present invention relates to improvements in the construction of lister planter attachments for tractors.

The principal objects of the invention are to provide a lister planter attachment of the directly connected, close coupled type, adapted to be mounted on the rear portion of a row crop tractor and comprising, at least, two planting units working on parallel furrows, and to embody in the attachment a unitary structure for gauging the furrow depth and driving the seed dispensing devices.

The foregoing objects, as well as other advantages, are attained in the simple and efficient construction embodying the preferred form of the invention hereinafter described in detail and illustrated in the accompanying drawings, where:

Figure 1 is a plan view showing the rear portion of a row crop tractor with the novel lister planter attachment mounted thereon;

Figure 2 is a side elevation with the tractor axle in section, with the attachment shown in lowered, or operating, position; and Figure 3 is a detail sectional view on the line 3—3 of Figure 1, with the attachment shown in raised position.

The invention is shown in combination with a row crop tractor of the type comprising a central body portion 10 and a wide spread rear axle structure 11, including depending end housings 12 on the outer sides of which the rear traction wheels 13 are mounted. The steering truck at the front end of the tractor (not shown) is controlled by a steering wheel 14 convenient to the operator's seat 15 mounted on the differential housing. The tractor is preferably equipped with power lift mechanism contained in a housing 16 secured to the differential housing at the back and driven by a shaft 17 extending from the transmission mechanism of the tractor. The power lift mechanism is preferably of the automatic, half revolution type, and each actuation thereof will oscillate a rockshaft 18 mounted on the axle structure of the tractor and provided with lifting arms 19 near each end for connection to an implement drawn by the tractor.

The attachment in which the present invention is embodied comprises a draft frame which preferably consists of a forwardly extending, U-shaped member 20, the arms of which are pivoted on trunnions 21 projecting from the inner faces of the depending housings 12. The forward or transverse portion of the draft member 20 is supported by links 22 connected at their upper ends to hand levers 23 pivoted on sector brackets 24 secured to each side of the tractor body. By adjustment of these hand levers, the height of the draft member 20 may be varied in an obvious manner. At each side of the tractor body the draft member 20 is provided with hitch members 25 on which the forward ends of plow beams 26 are pivotally mounted for vertical floating movement. A low forwardly located point of draft connection is thus provided for the beams 26 which trail rearwardly to points back of the rear axle structure of the tractor, but nevertheless as close thereto as efficient operation permits. Each beam 26 is connected by a flexible element or chain 27 to the end of one of the lifting arms 19 on the rockshaft 18, and oscillation of that shaft by power lift mechanism will accordingly raise and lower the plow beams and parts carried thereby.

Each of the beams carries a lister planter unit mounted on its rear end, comprising the usual shovel plow 28, at the rear of which are mounted the furrow forming and seed depositing elements 29 and the coverers 30. The furrow former includes an upright standard 31 secured to the rear end of the beam 26, and the upper ends of these standards on the respective beams serve as the point of pivotal connection for the seed dispensing mechanism and the driving elements therefor which will now be described.

The seed dispensing mechanism comprises a grain hopper 32 for each planter unit connected by a flexible tube 33 with the seed boot below it. As an integral part of each hopper base there is provided a depending arm 34 pivoted at its lower end at 35 to the upper end of standard 31. The arms 34 are rigidly connected by a crossbar 36, and dispensing mechanism in both hoppers is driven by a cross-shaft 37 located above the crossbar and provided with a driving sprocket or pinion 38 at its center. At its center, the crossbar 36 has secured thereto a forwardly and downwardly extending arm 39, which is fixed with relation to the cross bar and is preferably formed of two spaced bars, one at each side of the sprocket pinion 38, and connected between their ends by a bridge plate 40. The lower ends of the bars forming the arm 39 have a short axle 41 journaled thereon, the ends of which carry the twin ground wheels 42 which rotate with the axle 41. Between the bars of the arm 39 the axle 41 has a sprocket pinion 43 secured to it in alignment with the sprocket pinion 38 on the seed shaft 37. These pinions are connected by a sprocket chain 44 which preferably passes over an idler or slack roller 45 on the arm 39. With the unitary construction of seed hopper and driving wheel or wheels just described, it will be evident that all these parts will swing as a unit on the pivots 35 supporting them on the plow beams. Moreover the forward extension of the arm 39 serves to position the ground wheels 42 in alignment with the points of the plows 28 in proper position to act as means for gauging the depth of operation of the lister planter units.

In order to provide for adjustment of the planting depth and to hold the structure comprising the hoppers and the driven elements therefor against movement with respect to the beams 26, there is provided a cross-member or bar 46 secured in spaced bracket members 47 on each plow beam 26 and rigidly securing the beams against independent movement. This cross-member 46 is above the ground wheels 42 and just over these wheels it is provided with a bearing bracket 48 carrying a crank shaft 49 secured to a hand lever 50 which cooperated with a locking rack 51 forming part of the bracket 48. The arm of the crank shaft 49 extends forwardly and is connected by a depending link 52 with the front end of the arm 39. Accordingly, by adjustment of the lever 50, the ground wheels 42 may be raised and lowered to adjust the depth of plowing by rocking movement of the hopper supporting and driving means about the pivots 35 immediately to the rear of the axle 41, thereby providing substantially vertical movement for the wheels 42. When the attachment as a whole is lifted out of operative position by the power lift, as shown in Figure 3, the link 52 will serve to support the seed dispensing mechanisms and their associated parts and prevent undue tilting thereof.

There has accordingly been provided a structure permitting the planting units of a lister planter to be positioned in close coupled relation to the rear of a tractor and so constructed as to provide vertically adjustable depth gauging means which may be reached and adjusted from the operator's station on the tractor and which at the same time serve as driving means for the seed dispensing mechanisms of the planter units, which driving means is not affected by adjustment of the combined gauge and drive wheels.

The preferred embodiment of the invention herein disclosed is, of course, subject to modification without departure from the scope of the invention as defined in the following claims.

What is claimed is:

1. In a planting attachment for tractors comprising beams connected to a draft frame on the tractor and means on the tractor for lifting and lowering the beams, the combination therewith of planting units mounted on the rear of the respective beams including seed dispensing hoppers mounted for fore and aft tilting movement, a cross-member rigidly connecting the hoppers, an arm fixed on the cross-member and extending forwardly, a ground wheel on the end of said arm, and a driving connection between said wheel and the seed dispensing hoppers.

2. In a planting attachment for tractors comprising a pair of spaced beams connected to a draft frame on the tractor and means on the tractor for lifting and lowering the beams, the combination therewith of a planting unit mounted on the rear of each beam including a seed dispensing hopper mounted for fore and aft tilting movement, a cross-member rigidly connecting the hoppers, an arm fixed on the cross-member midway between the hoppers and extending forwardly, a ground wheel on the end of said arm, and a driving connection between said wheel and the seed dispensing hoppers.

3. In a planting attachment for tractors comprising a pair of spaced beams connected to a draft frame on the tractor and means on the tractor for lifting and lowering the beams, the combination therewith of a planting unit mounted on the rear of each beam including a seed dispensing hopper mounted for fore and aft tilting movement, a cross-member rigidly connecting the hoppers, an arm fixed on the cross-member midway between the hoppers and extending forwardly, a ground wheel on the end of said arm, a driving connection between said wheel and the seed dispensing hoppers, a cross-member rigidly connecting the beams above said wheel, and means on said member for adjusting the wheel vertically through rocking movement of the hoppers and drive connection as a unit.

4. In a planting attachment for tractors comprising a pair of spaced beams connected to a draft frame on the tractor and means on the tractor for lifting and lowering the beams, the combination therewith of a planting unit mounted on the rear of each beam including a seed dispensing hopper having a depending supporting arm pivoted at its lower end on the rear end of the beam, a cross-member rigidly connecting said arms, a drive shaft for the hoppers mounted above the cross-member and having a driving element centrally mounted thereon, a forwardly and downwardly extending arm fixed to the cross-member under said drive element, a pair of ground wheels journaled on an anxle carried by the forward end of said arm, a driving connection between said axle and the drive element on the hopper driving shaft, a cross-member rigidly connecting the beams above said wheels, and means on said member for adjusting the wheel vertically through rocking movement of the hoppers and driving connections thereto as a unit on the pivots of the depending arms.

5. A planter attachment for tractors comprising a draft frame having means for mounting it on the rear axle structure of a tractor, spaced implement beams trailing from said frame, a planting unit mounted on the rear portion of each beam including a furrow opener, a cross-member rigidly connecting the units together, a drive shaft for the units extending parallel to said cross-member, a rigid forwardly extending arm extending from the cross-member, a ground wheel on the end of the arm substantially in transverse alignment with the furrow openers, and a driving connection between said wheel and the drive shaft.

WILLIAM S. GRAHAM.